United States Patent
Mesmer

Patent Number: 5,465,638
Date of Patent: Nov. 14, 1995

[54] PUSH-TYPE COLLET AND SEAT ASSEMBLY

[75] Inventor: Larry P. Mesmer, Cedar Grove, N.J.

[73] Assignee: Metal Cutting Corp., Cedar Grove, N.J.

[21] Appl. No.: 334,541

[22] Filed: Nov. 4, 1994

[51] Int. Cl.[6] .................................................. B23B 13/12
[52] U.S. Cl. ........................ 82/127; 82/155; 279/51
[58] Field of Search .................. 279/51, 156; 82/126, 82/127, 155, 153

[56] References Cited

U.S. PATENT DOCUMENTS

| | | | |
|---|---|---|---|
| 3,718,339 | 2/1973 | Dunham et al. | 279/51 |
| 3,779,566 | 12/1973 | Tarbox et al. | 279/156 |
| 4,324,162 | 4/1982 | Uehara | 82/126 |
| 4,505,487 | 3/1985 | Davignon et al. | 279/156 |
| 4,702,484 | 10/1987 | Sandwick | 279/156 |
| 4,955,622 | 9/1990 | Peterson | 279/156 |
| 4,958,543 | 9/1990 | Newton et al. | 82/124 |
| 4,971,339 | 11/1990 | Treff | 279/50 |
| 5,050,896 | 9/1991 | Peterson | 279/156 |
| 5,058,467 | 10/1991 | Hoff et al. | 82/153 |
| 5,133,566 | 7/1992 | Baker | 279/156 |

*Primary Examiner*—Steven C. Bishop
*Attorney, Agent, or Firm*—Amster, Rothstein & Ebenstein

[57] ABSTRACT

A push-type collet and seat assembly has a push-type collet including an elongated cylindrical body having a rear end portion, a front end portion tapering inwardly towards a front end thereof, an opening extending longitudinally through the collet, and slots extending longitudinally through at least the front end portion in communication with the opening to divide the front end portion into separated compressible portions. A workpiece is inserted into the opening of the collet and extends forwardly of the compressible portions. A seat partially receives the collet therein so that, when the collet front end portion is forcibly wedged against the seat, the compressible portions are squeezed against the workpiece to fix the workpiece relative to the collet. A stop is disposed a predetermined distance forwardly of the seat and adapted to receive the workpiece front end so that, when the workpiece front end is forcibly wedged against the stop, the stop limits forward movement of the workpiece. A drive generally simultaneously moves the workpiece forwardly against the stop to forcibly wedge the workpiece front end thereagainst and moves the collet forwardly against the seat to forcibly wedge the collet front end portion thereagainst, such that the workpiece abuts against the stop prior to the collet fixing the workpiece relative to the collet.

21 Claims, 3 Drawing Sheets

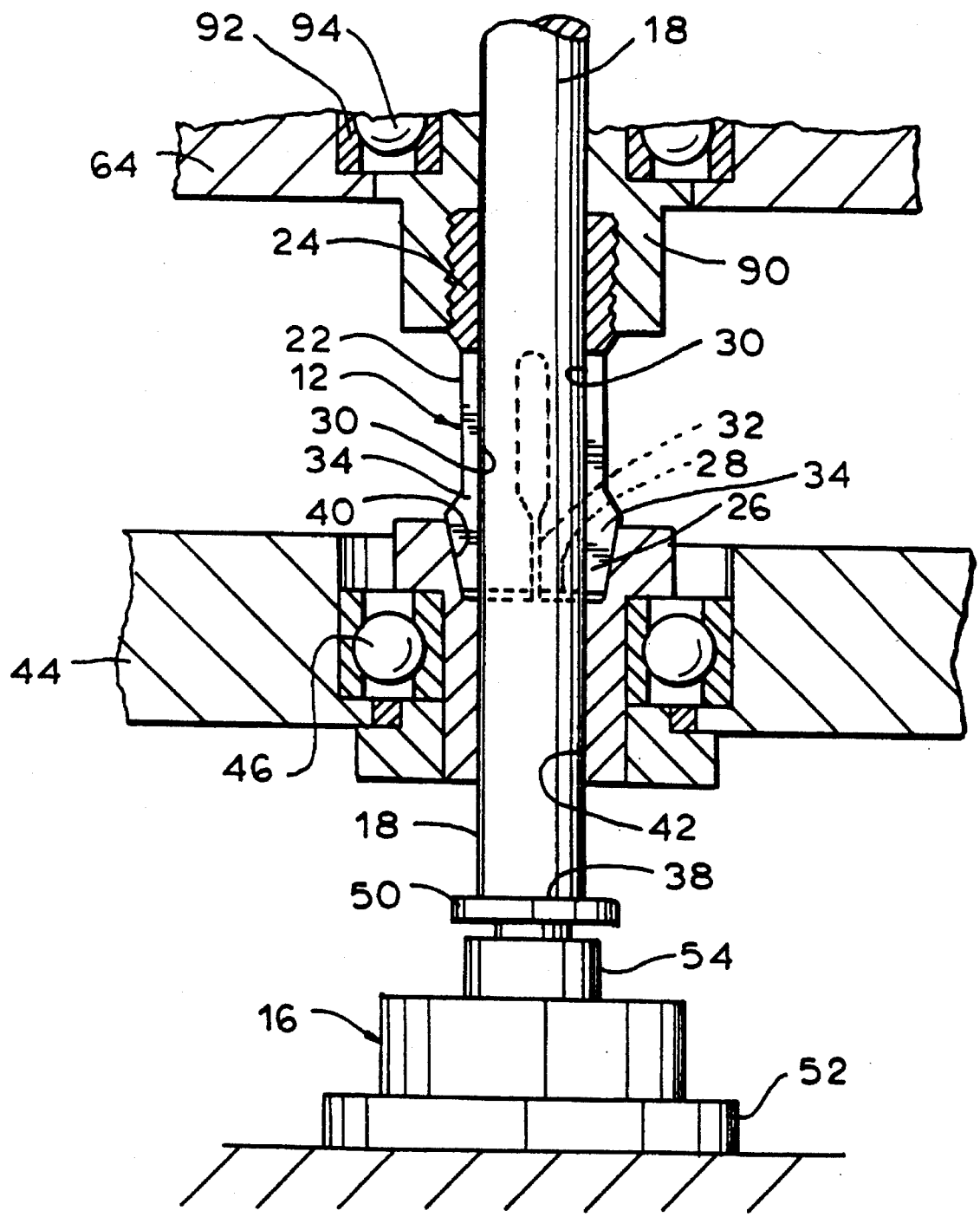
F I G. 3

5,465,638

PUSH-TYPE COLLET AND SEAT ASSEMBLY

BACKGROUND OF THE INVENTION

The present invention relates to a collet and seat assembly, and more particularly, to a push-type collet and seat assembly which enables a workpiece to be machined to a precise length without the need for a "facing" cut.

The use of a conventional pull-type collet for positioning stock (for example, a workpiece such as a rod or tube) is well-known in the cutting art. It is acceptable as long as it is recognized that a "facing cut" must be made if the stock is to be machined to a precise length. The facing cut is required because the collet draws the stock backwards as the collet is being tightened. The amount of drawback is not controllable where even small variations of the diameter of the stock being positioned are to be expected as even a small variation in the diameter will vary the exact instant at which the collet initially grasps and finally immobilizes the stock against longitudinal motion relative to the collet.

It is also known to use a conventional "dead length" collet. The dead length collet differs from the pull-type collet by closing upon the stock in a vertical, transverse and radial direction. Where the stock is to be machined to a precise length, it is recognized that a facing cut must be employed as no pressure is exerted by the stock against the stop as the collet is being tightened. As it cannot be expected that the surface of the stock being positioned will be totally clean and devoid of irregularities, the absence of any pressure exerted by the stock against the stop introduces an uncertainty factor. This uncertainty factor would be greatly reduced or eliminated if the stock were to exert pressure against the stop while the collet is being tightened as this would minimize or eliminate the effects of such irregularities.

Accordingly, it is an object of the present invention to provide a collet and seat assembly which will enable a workpiece to be machined to a precise length without the need for a "facing" cut.

Another object is to provide such an assembly which employs a push-type collet.

A further object is to provide such an assembly which minimizes the effects of minute projections on the forward end of the stock by forcing the stock against a stop.

It is also an object of the present invention to provide such an assembly which is simple and inexpensive to manufacture and economical and easy to use and maintain.

SUMMARY OF THE INVENTION

It has now been found that the above and related objects of the present invention are obtained in a push-type collet and seat assembly for use with a workpiece having a front end. The assembly comprises a push-type collet including an elongated cylindrical body member having a rear end portion, a front end portion tapering inwardly towards a front end thereof, an opening extending longitudinally through the collet, and slot means extending longitudinally through at least the front end portion in communication with the opening to divide the front end portion into separated compressible portions. A seat partially receives the collet therein so that, when the front end portion of the collet is forcibly wedged against the seat, the compressible portions of the front end portion are squeezed against the workpiece to fix the workpiece relative to the collet. A stop is disposed a predetermined distance forwardly of the seat and adapted to receive the front end of the workpiece so that, when the workpiece inserted in the opening of the collet extends forwardly of the compressible portions of the front end portion, the front end of the workpiece is forcibly wedged against the stop, and the stop limits forward movement of the workpiece. Drive means are provided for generally simultaneously moving the workpiece forwardly against the stop to forcibly wedge the front end of the workpiece thereagainst and moving the collet forwardly against the seat to forcibly wedge the front end portion of the collet thereagainst, such that the workpiece abuts against the stop prior to the collet fixing the workpiece relative to the collet.

In a preferred embodiment, the seat is rotatable by the front end portion of the collet, and the stop is rotatable by the front end of the workpiece. Means are provided for retracting the stop relative to the seat and, hence, the front end of the workpiece. Preferably the rear end portion of the collet is externally threaded, and the assembly includes a nut having an internally threaded opening to receive the threaded rear end portion, the nut being adapted to rotate the collet.

The present invention additionally encompasses in combination the assembly and the workpiece having a front end.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 3 is a fragmentary top plan view of a portion thereof, to an enlarged scale and with the assembly in the closed orientation.

DETAILED DESCRIPTION OF THE PREFERRED EMBODIMENTS

Figure 1:
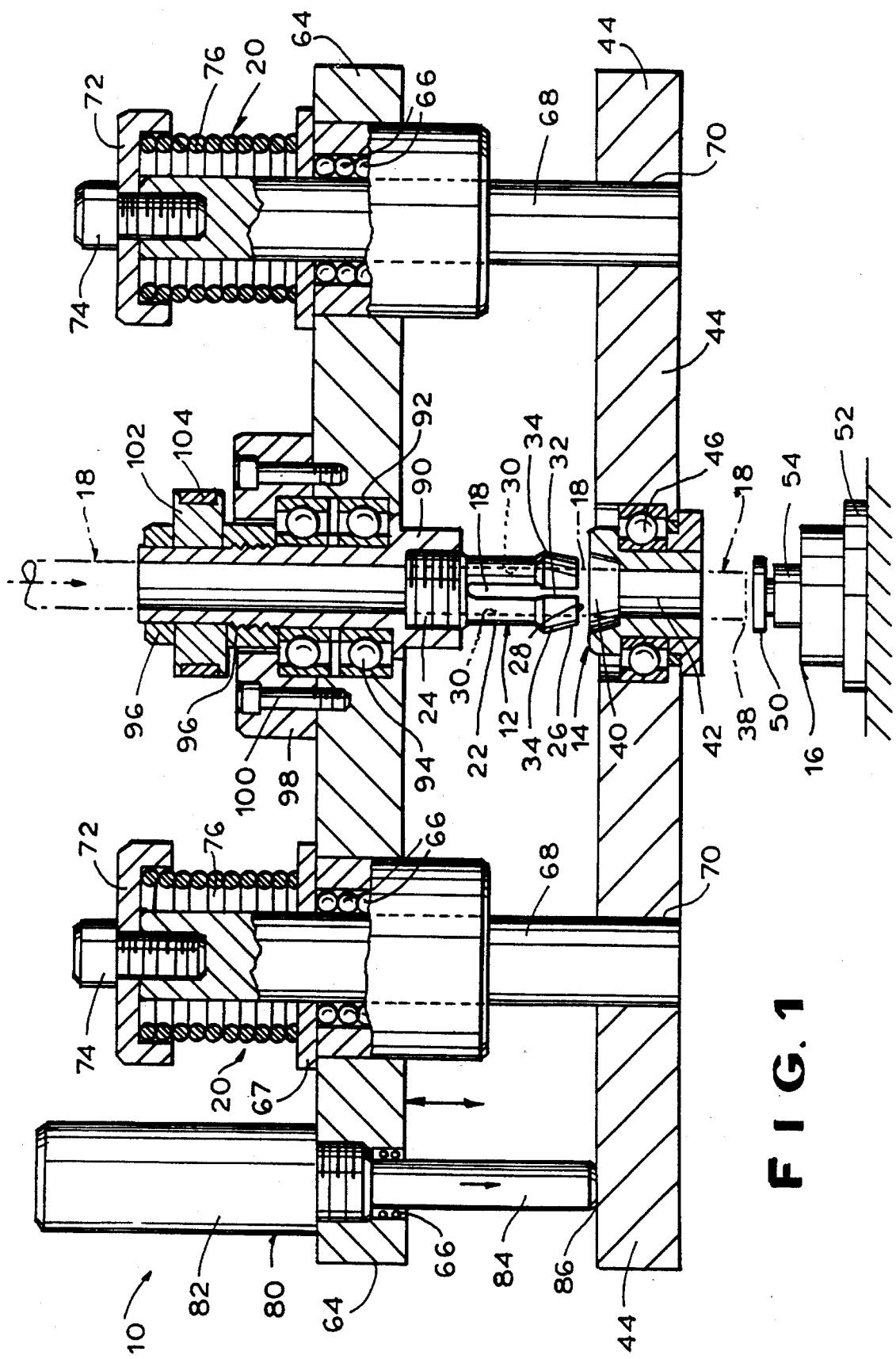
FIG. 1 is a top plan view of an assembly according to the present invention in the open orientation, with portions thereof removed to reveal details of internal construction, and with the workpiece being fragmentarily illustrated in phantom line.
Figure 2:
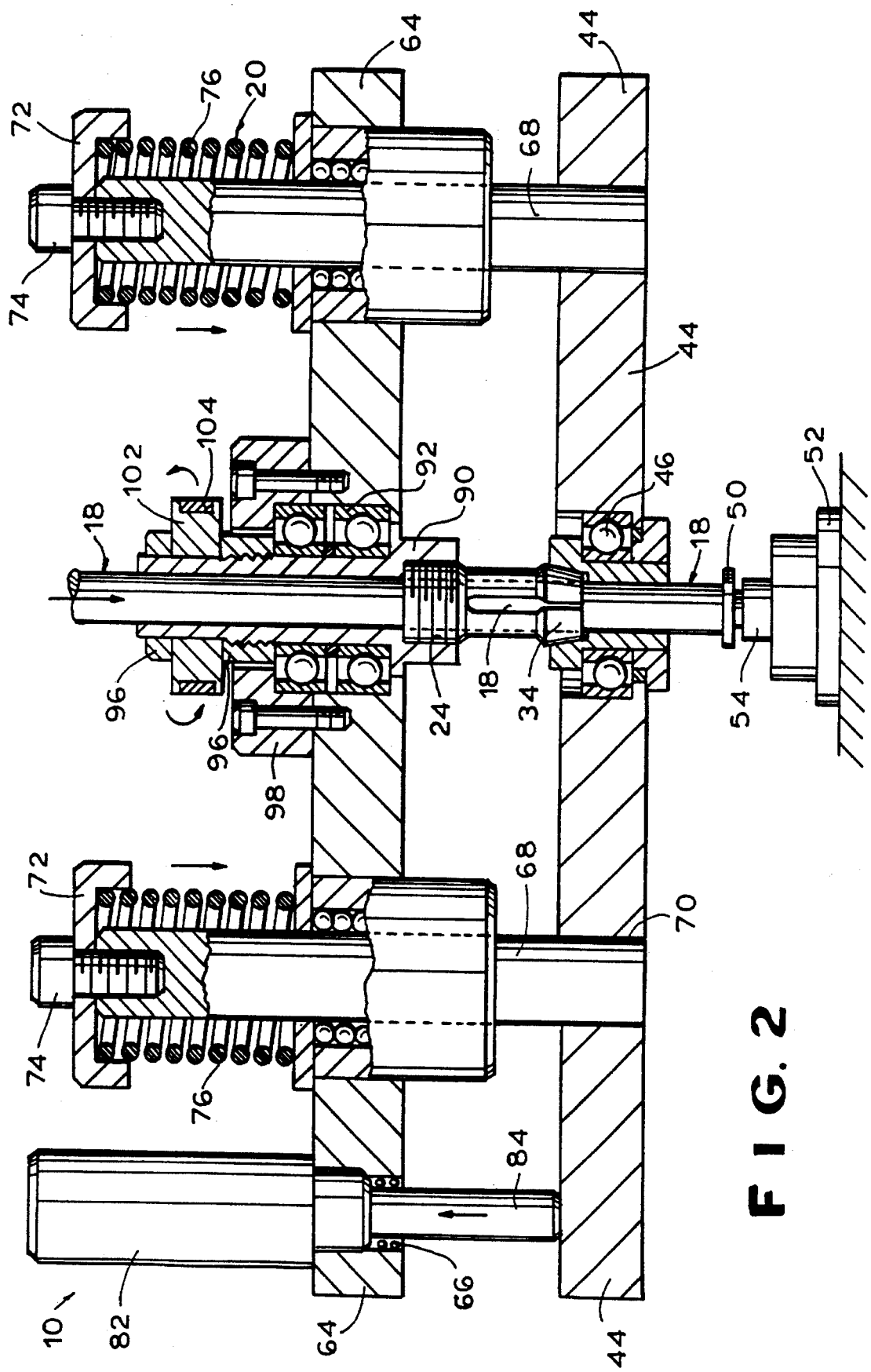
FIG. 2 is a view similar to FIG. 1 but with the assembly in the closed orientation and with the workpiece being illustrated in solid line.

Referring now to FIGS. 1 and 2, therein illustrated is a push-type collet and seat assembly according to the present invention, generally designated by the reference numeral 10. The assemby 10 is shown in an open orientation enabling relative movement of the collet and workpiece in FIG. 1 and in a closed orientation precluding relative motion of the workpiece and collet in FIG. 2.

The major elements of the assembly 10 are, of course, the push-type collet, generally designated 12, and the seat, generally designated 14, for partially receiving the collet therein. A stop generally designated 16 is disposed a predetermined distance forwardly of the seat 14 so that when a workpiece 18 is inserted through the opening of the collet 12 and is subsequently forcefully wedged against the stop 16 by the collet 12, the stop 16 limits forward movement of the workpiece 18. Drive means 20 are provided for generally simultaneously moving the workpiece 18 forwardly against the stop 16 and the collet 12 forwardly against the seat 14 such that the workpiece 18 forcibly abuts against the stop 16 prior to the collet 12 fixing the workpiece 18 against longitudinal movement relative to the collet 12.

Referring now also to FIG. 3, the push-type collet 12 includes an elongated cylindrical body member 22 having a rear end portion 24 and a front end portion 26 tapering inwardly towards the front end 28 thereof. A single opening 30 extends longitudinally through the collet 12 and a plurality (here, four) of equiangularly disposed parallel slots 32 extend longitudinally through at least the front end portion 26 in communication with the opening 30 to devide the front end portion 26 into a plurality (here, four) of separated compressible portions 34. The rear end portion 24 of the collet 12 is preferably externally threaded and adapted for engagement with a nut or like member having an internally threaded opening to receive the threaded rear end portion 24. The nut itself is associated with the drive means 20, as will be explained hereinafter in greater detail.

As the push-type collet of the present invention is similar to a conventional pull-type collet except for the direction of the taper of the front end portion 26 (which in a pull-type collet is outwardly towards the front end thereof), a further description of the collet 12 itself is not deemed necessary herein. Those familiar with the collet art will be readily able to construct and use a collet 12 according to the present invention.

The workpiece or stock 18 is typically in the form of a rod or tube, whether square or circular and whether hollow or solid, which is intended to be machined to a precise length without the need of a "facing" cut. The workpiece 18 is inserted into the opening 30 of the collet 12, typically through the back end portion 24 thereof, so that it extends forwardly of the compressible portions 34 of the front end portion 26 of the collet 12. The workpiece 18 defines a generally planar front end 38, illustrated in FIG. 1 as slightly spaced longitudinally from the back end of stop 16.

The seat 14 defines a recess 40 at the back end thereof adapted to partially receive the collet 12 therein so that, when the collet front end portion 26 is forcefully wedged into the seat recess 40 and against the seat 14, the compressible portions 34 of the collet front end portion 26 are squeezed against the outer periphery of the workpiece 18 to fix the workpiece against movement relative to the collet 12, whether longitudinal or rotational. To this end, the sidewall of the seat recess 40 is tapered inwardly toward the front end thereof so as to force the collet compressible portions 34 to approach one another and temporarily eliminate the slots 32 therebetween. The seat recess 40 communicates with an aperture 42 extending the rest of the way through the seat 14 and configured and dimensioned to receive therethrough the workpiece front end 38.

Preferably the seat 14 is rotatably mounted in a front mounting plate 44, for example, by bearings 46 enabling rotation of the seat 14 relative to the stationary mounting plate 44. Typically the fit between the collet front end portion 26 and the collet seat 14 will be sufficiently tight that the collet 12 and seat 14 will rotate together as a unit (either with or without some slippage). Rotatable joints of this type are well-known in the mechanical arts and need not be set forth in further detail herein.

The stop 16 is disposed a predetermined distance forwardly of the seat 14 and adapted to receive thereagainst the workpiece front end 38 so that, when the workpiece front end 38 is forcibly wedged against the stop 16, the stop 16 limits forward movement of the workpiece 18. The stop 16 includes a planar surface 50 against which the workpiece front end 38 abuts when the assembly 10 is in the closed orientation. The stop planar surface 50 is preferably rotatably secured to the stop base 52 (typically by a ball bearing system such as that illustrated between the seat 14 and the front mounting plate 44) so that the stop planar surface 50 may be rotated freely by the rod front end 38. Additionally, the seat 16 includes means 54 for retracting the stop planar surface 50 relative to the seat 14 and hence the workpiece front end 38. Thus, once the workpiece 18 has been set to the appropriate length, the stop planar surface 50 is retracted toward the stop base 52 and away from the front mounting plate 44 to enable machining the workpiece 18 and dropping or otherwise removing the same from the assembly 10. Thus, the seat planar surface 50 is both rotatable with the workpiece 18 and retractable relative to the seat 14. As rotatable and retractable stops are well-known in the mechanical arts, it is not deemed necessary to set forth further details thereof herein.

Once the stop planar surface 50 has been retracted and the machined workpiece 18 removed, the stop planar surface 50 is returned to its original position, the collet 12 is returned to its original open position with the compressible portions 34 again defining slots 32 (as illustrated in FIG. 1) and the workpiece 18 is advanced through the collet aperture 30, the seat recess 40, the seat aperture 42 and further against the stop planar surface 50.

While both the front mounting plate 44 and the stop 16 are stationary during the manufacture of a given workpiece or a series of a given workpiece, the stop 16 is adjustable in the longitudinal direction by retracting means 54 so as to enable the spacing therebetween, and hence the length of the cut workpiece 18, to be varied from one series of workpieces to another series of workpieces.

On the other hand, the rear mounted plate 64 is moved not only during each series of cutting operations for a given type of workpiece 18, but during each single cutting operation. Thus, at each end, the rear mounting plate 64 is mounted by linear bearings 66 about a support 68 which is fixedly mounted at 70 in the front mounting plate 44 and extends longitudinally rearwardly through the rear mounting plate 64. The linear bearings 66 are disposed in a bearing assembly 67 fixedly secured to the rear mounting plate 64 for movement therewith. Each of the two supports 68 has at the rear thereof a laterally extending head 72 secured thereto by a screw 74. A compression spring 76 is trapped at one end by the head 72 and at the other end by the rear mounting plate 64, either directly or indirectly.

As the drive means 20—namely, compression springs 76—are designed to move the rear mounting plate 64 forwardly, closer to the front mounting plate 44, a second drive means 80 is provided for moving the rear mounting plate 64 rearwardly, further away from the front mounting plate 44, after each cutting operation. Thus, the second drive means 80 may comprise a pneumatic or hydraulic cylinder 82 threadedly engaging the rear mounting plate 64 for movement therewith as a unit. A piston 84 has one end disposed within the cylinder 82 for reciprocating movement thereby and the opposite end 86 bearing on the back surface of the front mounting plate 44. Preferably the portion of the piston 84 passing through the rear mounting plate 64 is shielded from contact therewith by linear bearings 66'. Although only one second drive means 80 is illustrated, typically there is one second drive means 80 at each end of the mounting plates 44, 64. The two second drive means 80 typically having the cylinders 82 thereof driven by a common source—e.g., a common air line.

In order to provide for longitudinal motion of the collet 12 with the rear mounting plate 64 and for rotation of the collet 12 relative to the rear mounting plate 64, the rear end portion 24 of collet 12 is threadedly engaged with a nut-defining housing 90. The housing 90 extends rearwardly through the rear mounting plate 64 (intermediate the supports 68) and has a nut-like front end threadedly engaging the threaded rear portion 24 of collet 12 and a rear end projecting rearwardly from the rear mounting plate 64. The housing 90 is secured to the rear mounting plate 64 by means of a bearing assembly 92 including bearings 94, thereby to permit rotation of the housing 90 relative to the rear mounting plate 64. The bearing assembly 92 is fixed to the rear mounting plate 64 intermediate a forward flange of the housing 90 and a nut 96 and corners 98 secured to the back of the rear mounting plate 64 by screws 100. A drive pulley 102, driven by a drive belt 104, is mounted on the housing 90 to rotate the housing 90 and workpiece 18. The mechanical linkages enabling longitudinal motion and rotational motion of the workpiece 18 relative to the rear mounting plate 64 are well-known in the art and hence need not be described in further detail.

Referring now to FIG. 1, to operate the device 10, a workpiece or stock 18 is disposed within the collet 12. Preferably, the workpiece 18 is fed forwardly through the housing 90 and collet 12 until the workpiece front surface 38 approaches or engages the rear planar surface 50 of stop 16. The distance between the collet 12 and the stop 16 is set for the length of the cut workpiece 18 desired.

Next, referring now to FIG. 2, each second drive means 80 is released—for example, by releasing the air pressure within cylinder 82—so that piston 84 can retreat rearwardly into cylinder 82. The drive means 20, including the compressed springs 76, then exert a forward biasing pressure on the rear mounting plate 64 which drives it toward the front mounting plate 44. As the front end 26 of collet 12 slides forward into the tapered recess 40 of seat 14, the internal taper of the seat 40 engages the external taper of the workpiece front portion 34 so that the compressible portions 34 thereof are driven together as the collet 12 advances on the seat 14.

Two actions occur at this point. First, the inward movement of the compressible portions 34 of the collet head 26 (resulting from the forward movement of the collet front end portion 26 in the tapered recess 40) causes the compressible portions to exert radial pressure on the workpiece in order to securely lock it into position. Second, the forward movement of the collet 12 eventually draws therewith the workpiece 18 and accurately positions the workpiece 18 relative to the stop 16. As the collet 12 is closing in on the workpiece 18, the forward driving pressure of the collet 12 firmly pushes the workpiece front end 38 against the stop back surface 50, thereby to minimize the effect of any minute projections on the end of the workpiece.

Thus, it will be seen that the critical function of the drive means is to generally simultaneously move the workpiece 18 forward against the stop 16, thereby to forcibly wedge the front end 38 of the workpiece thereagainst, and move the collet 12 forwardly against the seat 14, thereby to forcibly wedge the front end portion 26 of the collet thereagainst such that the workpiece 18 abuts against the stop 16 prior to the collet 12 fixing the workpiece 18 relative to the collet 12.

The setting of the workpiece 18 is completed when enough forward pressure on the collet 12 is produced to firmly hold the workpiece for machining (i.e., cutting). More or less pressure will not affect the position of the workpiece 18 as long as the stop 16 and the collet 12 are sufficiently rigid. There may be a slight movement of the workpiece 18 and the collet 12 when the stop 16 is released from its position (due to a pressure drop), but this movement is constant from one workpiece to the next and is not dependent on variations in the diameter of the workpiece. Accordingly, the initial setting of the separation between the collet and the stop should take this slight forward movement into consideration.

As the workpiece 18 is being rotated by the drive pulley 102 (acting through housing 90), the portion of the workpiece 18 projecting forwardly from the seat aperture 42 may be easily machined or otherwise cut to a desired length by conventional means. Prior to machining, the rear planar surface 50 of stop 16 is retracted by retracting means 54 so that the cut workpiece 18 falls or is otherwise removed from the assembly 10.

At this point, the second drive means 80 is energized—for example, by introducing air pressure within the cylinder 82—so that piston 84 is ejected forwardly therefrom against front moving plate 44. The result is that the rear moving plate 64 retreats, thereby compressing the springs 76 of drive means 20. Simultaneously, the collet front end portion 26 is being withdrawn from the seat recess 40, thus allowing the compressible portions 34 to separate and once again define the slots 32. The outward movement of the collapsible portions 34 releases the setting of the collet 12 on the workpiece 18 so that the latter again becomes free for both longitudinal and rotational movement relative to collet 18, as best seen in FIG. 1. Once the workpiece 18 is fed and properly positioned relative to the stop 50, the drive means 20 is cocked, and piston 84 maintained stationary, the system is again ready to fire (that is, release the second drive means 80).

To summarize, the present invention provides a collet and seat assembly which enables a workpiece to be machined to a precise length without the need for a facing cut. The present invention employs a push-type collet and minimizes the effect of minute projections on the forward end of a stock by forcing the stock against a stop. The assembly may be simple and inexpensive to manufacture and economical and easy to use and maintain.

While the apparatus of the present invention has been described in terms of a horizontally longitudinal orientation with front and rear mounting plates, clearly the same apparatus may be used in a vertically longitudinal orientation wherein the front and back mounting plates are the bottom and top mounting plates, respectively—i.e., FIGS. 1–3 would be elevation views. In this application, gravity drops the workpiece 18 through the collet 12 and against the stop surface 50. Then a pneumatic cylinder forces top plate 64 down toward bottom plate 44, thereby forcing collet 12 into the seal 14 and forcing the workpiece 18 tightly against the stop surface 50, eventually locking workpiece 18 in position.

Now that the preferred embodiments of the present invention has been shown and described, various modifications and improvements thereon will become readily apparent to those skilled in the art. Accordingly, the spirit and scope of the present invention is to be construed broadly and limited only by the appended claims, and not by the foregoing specification.

I claim:

1. A push-type collet and seat assembly for use with a workpiece having a front end, comprising:

(A) a push-type collet including an elongated cylindrical body member having a rear end portion, a front end portion tapering inwardly towards a front end thereof, an opening extending longitudinally through said collet, and slot means extending longitudinally through at least said collet front end portion in communication with said opening to divide said collet front end portion into separated compressible portions;

(B) a seat partially receiving said collet therein so that, when said collet front end portion is forcibly wedged against said seat, said compressible portions of said collet front end portion are squeezed against a workpiece to fix the workpiece relative to said collet;

(C) a stationary stop disposed a predetermined distance forwardly of said seat and adapted to receive the workpiece front end without moving so that, when workpiece inserted in said opening of said collet extends forwardly of said compressible portions of said front end portion, the workpiece front end is forcibly wedged against said stop and said stop limits forward movement of the workpiece; and (D) drive means for generally simultaneously moving the workpiece forwardly against said stop to forcibly wedge the workpiece front end thereagainst and moving said collet forwardly against said seat to forcibly wedge said collet front end portion thereagainst, such that the workpiece abuts against said stop prior to said collet fixing said workpiece relative to the collet.

2. The assembly of claim 1 wherein said seat is rotatable by said collet front end portion.

3. The assembly of claim 1 wherein said stop is rotatable by the workpiece front end.

4. The assembly of claim 1 including means for retracting said stop relative to said seat and, hence, the workpiece front end, after said collet fixes the workpiece relative to said collet.

5. The assembly of claim 1 wherein said collet rear end portion is externally threaded, said assembly additionally including a nut having an internally threaded opening to receive said threaded collet rear end portion, said nut being adapted to rotate said collet.

6. In combination, the assembly of claim 1 and a workpiece having a front end.

7. A push-type collet and seat assembly for use with a workpiece having a front end, comprising:

(A) a push-type collet including an elongated cylindrical body member having a rear end portion, a front end portion tapering inwardly towards a front end thereof, an opening extending longitudinally through said collet, and slot means extending longitudinally through at least said collet front end portion in communication with said opening to divide said collet front end portion into separated compressible portions;

(B) a seat partially receiving said collet therein so that, when said collet front end portion is forcibly wedged against said seat, said compressible portions of said collet front end portion are squeezed against a workpiece to fix the workpiece relative to said collet, said seat being rotatable by said front end portion of said collet;

(C) a stationary stop disposed a predetermined distance forwardly of said seat and adapted to receive the workpiece front end without moving so that, when a workpiece inserted in said opening of said collet extends forwardly of said compressible portions of said front end portion, the workpiece front end is forcibly wedged against said stop and said stop limits forward movement of said workpiece, said stop being rotatable by the workpiece front end;

(D) drive means for generally simultaneously moving the workpiece forwardly against said stop to forcibly wedge the workpiece front end thereagainst and moving said collet forwardly against said seat to forcibly wedge said collet front end portion thereagainst, such that the workpiece abuts against said stop prior to said collet fixing the workpiece relative to said collet; and (E) means for retracting said stop relative to said seat.

8. The assembly of claim 7 wherein said collet rear end portion is externally threaded, said assembly additionally including a nut having an internally threaded opening to receive said threaded collet rear end portion, said nut being threadedly engaged on said threaded collet rear end portion and associated with said drive means.

9. A push-type collet and seat assembly comprising:

(A) a push-type collet including an elongated cylindrical body member having a rear end portion, a front end portion tapering inwardly towards a front end thereof, an opening extending longitudinally through said collet, and slot means extending longitudinally through at least said collet front end portion in communication with said opening to divide said collet front end portion into separated compressible portions;

(B) a workpiece inserted in said opening of said collet and extending forwardly of said compressible portions of said collet front end portion, said workpiece having a front end;

(C) a stationary seat partially receiving said collet therein so that, when said collet front end portion is forcibly wedged against said seat, said compressible portions of said collet front end portion are squeezed against said workpiece to fix said workpiece relative to said collet;

(D) a stop disposed a predetermined distance forwardly of said seat and adapted to receive said workpiece front end without moving so that, when said workpiece front end is forcibly wedged against said stop, said stop limits forward movement of said workpiece; and (E) drive means for generally simultaneously moving said workpiece forwardly against said stop to forcibly wedge said workpiece front end thereagainst and moving said collet forwardly against said seat to forcibly wedge said collet front end portion thereagainst, such that said workpiece abuts against said stop prior to said collet fixing said workpiece relative to said collet.

10. The assembly of claim 9 wherein said seat is rotatable by said collet front end portion.

11. The assembly of claim 9 wherein said stop is rotatable by said workpiece front end.

12. The assembly of claim 9 including means for retracting said stop relative to said seat and, hence, said workpiece front end, after said collet fixes the workpiece relative to said collet.

13. The assembly of claim 9 wherein said collet rear end portion is externally threaded, said assembly additionally including a nut having an internally threaded opening to receive said threaded collet rear end portion, said nut being adapted to rotate said collet.

14. A push-type collet and seat assembly comprising:

(A) a push-type collet including an elongated cylindrical body member having a rear end portion, a front end portion tapering inwardly towards a front end thereof, an opening extending longitudinally through said collet, and slot means extending longitudinally through at least said collet front end portion in communication with said opening to divide said collet front end portion into separated compressible portions;

(B) a workpiece inserted in said opening of said collet and extending forwardly of said compressible portions of said collet front end portion, said workpiece having a front end;

(C) a seat partially receiving said collet therein so that, when said collet front end portion is forcibly wedged against said seat, said compressible portions of said collet front end portion are squeezed against said workpiece to fix said workpiece relative to said collet, said seat being rotatable by said collet front end portion;

(D) a stationary stop disposed a predetermined distance forwardly of said seat and adapted to receive said workpiece front end without moving so that, when said workpiece front end is forcibly wedged against said stop, said stop limits forward movement of said workpiece, said stop being rotatable by said workpiece front end;

(E) drive means for generally simultaneously moving said workpiece forwardly against said stop to forcibly wedge said workpiece front end thereagainst and moving said collet forwardly against said seat to forcibly wedge said collet front end portion thereagainst, such that said workpiece abuts against said stop prior to said collet fixing said workpiece relative to said collet; and (F) means for retracting said stop relative to said seat.

15. The assembly of claim 14 wherein said collet rear end portion is externally threaded, said assembly additionally including a nut having an internally threaded opening to receive said threaded collet rear end portion, said nut being threadedly engaged on said threaded collet rear end portion and associated with said drive means.

16. The assembly of claim 14 wherein said retracting means retracts said stop after said collet fixes said workpiece relative to said collet.

17. A push-type collet and seat assembly for use with a workpiece having a front end, comprising:

(A) a push-type collet including an elongated cylindrical body member having an externally threaded rear end portion, a front end portion tapering inwardly towards a front end thereof, an opening extending longitudinally through said collet, and slot means extending longitudinally through at least said collet front end portion in communication with said opening to divide said collet front end portion into separated compressible portions;

(B) a seat partially receiving said collet therein so that, when said collet front end portion is forcibly wedged against said seat, said compressible portions of said collet front end portion are squeezed against a workpiece to fix the workpiece relative to said collet;

(C) a stop disposed a predetermined distance forwardly of said seat and adapted to receive the workpiece front end so that, when a workpiece inserted in said opening of said collet extends forwardly of said compressible portions of said front end portion, the workpiece front end is forcibly wedged against said stop and said stop limits forward movement of the workpiece;

(D) drive means for generally simultaneously moving the workpiece forwardly against said stop to forcibly wedge the workpiece front end thereagainst and moving said collet forwardly against said seat to forcibly wedge said collet front end portion thereagainst, such that the workpiece abuts against said stop prior to said collet fixing said workpiece relative to the collet; and (E) a nut having an internally threaded opening to receive said threaded collet rear end portion, said nut being adapted to rotate said collet.

18. In combination, the assembly of claim 17 and a workpiece having a front end.

19. A push-type collet and seat assembly for use with a workpiece having a front end, comprising:

(A) a push-type collet including an elongated cylindrical body member having an externally threaded rear end portion, a front end portion tapering inwardly towards a front end thereof, an opening extending longitudinally through said collet, and slot means extending longitudinally through at least said collet front end portion in communication with said opening with said opening to divide said collet front end portion into separated compressible portions;

(B) a seat partially receiving said collet therein so that, when said collet front end portion is forcibly wedged against said seat, said compressible portions of said collet front end portion are squeezed against a workpiece to fix the workpiece relative to said collet, said seat being rotatable by said front end portion of said collet;

(C) a stop disposed a predetermined distance forwardly of said seat and adapted to receive the workpiece front end so that, when a workpiece inserted in said opening of said collet extends forwardly of said compressible portions of said front end portion, the workpiece front end is forcibly wedged against said stop and said stop limits forward movement of said workpiece, said stop being rotatable by the workpiece front end;

(D) drive means for generally simultaneously moving the workpiece forwardly against said stop to forcibly wedge the workpiece front end thereagainst and moving said collet forwardly against said seat to forcibly wedge said collet front end portion thereagainst, such that the workpiece abuts against said stop prior to said collet fixing the workpiece relative to said collet;

(E) means for retracting said stop relative to said seat; and (F) a nut having an internally threaded opening to receive said threaded collet rear end portion, said nut being threadedly engaged on said threaded collet rear end portion and associated with said drive means.

20. A push-type collet and seat assembly comprising:

(A) a push-type collet including an elongated cylindrical body member having an externally threaded rear end portion, a front end portion tapering inwardly towards a front end thereof, an opening extending longitudinally through said collet, and slot means extending longitudinally through at least said collet front end portion in communication with said opening to divide said collet front end portion into separated compressible portions;

(B) a workpiece inserted in said opening of said collet and extending forwardly of said compressible portions of said collet front end portion, said workpiece having a front end;

(C) a seat partially receiving said collet therein so that, when said collet front end portion is forcibly wedged against said seat, said compressible portions of said collet front end portion are squeezed against said workpiece to fix said workpiece relative to said collet;

(D) a stop disposed a predetermined distance forwardly of said seat and adapted to receive said workpiece front end so that, when said workpiece front end is forcibly wedged against said stop, said stop limits forward movement of said workpiece;

(E) drive means for generally simultaneously moving said workpiece forwardly against said stop to forcibly wedge said workpiece front end thereagainst and moving said collet forwardly against said seat to forcibly wedge said collet front end portion thereagainst, such that said workpiece abuts against said stop prior to said collet fixing said workpiece relative to said collet; and (F) a nut having an internally threaded opening to receive said threaded collet rear end portion, said nut being adapted to rotate said collet.

21. A push-type collet and seat assembly comprising:

(A) a push-type collet including an elongated cylindrical body member having an externally threaded rear end portion, a front end portion tapering inwardly towards a front end thereof, an opening extending longitudinally through said collet, and slot means extending longitudinally through at least said collet front end portion in communication with said opening to divide said collet front end portion into separated compressible portions;

(B) a workpiece inserted in said opening of said collet and extending forwardly of said compressible portions of said collet front end portion, said workpiece having a front end;

(C) a seat partially receiving said collet therein so that, when said collet front end portion is forcibly wedged against said seat, said compressible portions of said collet front end portion are squeezed against said workpiece to fix said workpiece relative to said collet, said seat being rotatable by said collet front end portion;

(D) a stop disposed a predetermined distance forwardly of said seat and adapted to receive workpiece said front end so that, when said workpiece front end is forcibly wedged against said stop, said stop limits forward movement of said workpiece, said stop being rotatable by said workpiece front end;

(E) drive means for generally simultaneously moving said workpiece forwardly against said stop to forcibly wedge said workpiece front end thereagainst and moving said collet forwardly against said seat to forcibly wedge said collet front end portion thereagainst, such that said workpiece abuts against said stop prior to said collet fixing said workpiece relative to said collet;

(F) means for retracting said stop relative to said seat; and (G) a nut having an internally threaded opening to receive said threaded collet rear end portion, said nut being threadedly engaged on said threaded collet rear end portion and associated with said drive means.

* * * * *